UNITED STATES PATENT OFFICE.

JAMES CAMPBELL, OF CHICAGO, ILLINOIS.

IMPROVEMENT IN PROCESSES OF PRESERVING MEAT IN TRANSIT.

Specification forming part of Letters Patent No. 190,128, dated May 1, 1877; application filed July 29, 1876.

*To all whom it may concern:*

Be it known that I, JAMES CAMPBELL, of Chicago, county of Cook, and State of Illinois, have invented a new and useful Improvement in Process for Preserving Meats in Transit, of which the following is a specification:

The nature of the present invention consists in the method and application of fine wood fiber, such as sawdust, fine shavings, or tan-bark, salt, sal-ammoniac, niter, and sulphate of soda, to the preservation of partially-cured meats in transit, more especially on cars. Such meats are now generally shipped in refrigerator-cars; but as this method is too expensive to be practicable, I have devised the following method of using a small quantity of ice with chemical and wood fiber, which, when combined as hereinafter described, reduce the temperature sufficiently for the protection of the kind of meats above designated.

At a temperature of 80° Fahrenheit I take to ten barrels of sawdust, tan-bark, or fine refuse of planing-mills, fifty pounds of ice, ten pounds of salt, five pounds of sal-ammoniac; niter, five pounds; and sulphate of soda, eight; and apply them in the following manner:

I first put a layer of sawdust or the wood fiber on the bottom of a car to the depth of three or four inches, and then moisten it with so much water as it will absorb without dripping, and then sprinkle over the sawdust powdered sal-ammoniac, niter, and sulphate of soda, after they have been first pulverized and thoroughly mixed, in the proportion given, and then spread over this finely-broken ice, in the proportions given, and on the top of this mass place the boxes or packages of meat, leaving spaces between them of two or three inches, to receive the refrigerating material, which are to be filled in first with sawdust, then with the pulverized chemicals, and then broken ice, care being taken that no more than six to eight inches in depth of sawdust be put in before applying the chemicals, and to wet the sawdust to the extent that it will absorb water. The application of the material is repeated till the packages are covered from two to four inches with sawdust, and then, after applying the ice and chemicals, a second tier of packages can be placed over the first layer till a car is loaded.

It is well here to state that between the inside of the car and the packages a layer of about four inches of sawdust is required.

The sawdust and chemicals should be used before the broken ice, and the latter applied as rapidly as possible, that it may produce its frigid effect on the water, with the chemicals between the layers of sawdust to prevent evaporation, and for this reason but a small surface of sawdust should be iced before a second layer is put on. By this means the temperature of the mass will be brought down to about 40°, and will not get sufficiently high for meat to sour in a transit of one thousand miles on cars running at ordinary speed. Where the heat is greater than 80°, the ice and chemicals should be increased about one-fourth for every addition of 5° of heat. Where cars are to carry meat a long distance, a covering of four inches of dry sawdust may be spread on top of the refrigerating compound.

I am aware that sawdust, salt, and other chemicals have been employed to attain a low temperature; but I am not aware that the ingredients enumerated have been before used in layers, and in the manner described, for the preservation of meats in transit, wherein broken ice has been so utilized that so small a quantity is made to produce the low temperature required.

It is well to state that the proportions of the ingredients may be changed and produce a good result; but I prefer the proportions given.

I claim—

The herein-described process for preserving meats in transit, which consists in packing packages of meat between layers in the following order: first, a layer of sawdust; then a composition of salt, sal-ammoniac, niter, and sulphate of soda; then a layer of ice; then a package of meat; then sawdust again, and so on, substantially as described.

JAMES CAMPBELL.

Witnesses:
GEO. G. BELLOWS,
JACOB LANSING.